United States Patent
Pimputkar et al.

(10) Patent No.: US 8,706,933 B2
(45) Date of Patent: Apr. 22, 2014

(54) BUS CONTROL FOR A DOMESTIC APPLIANCE

(75) Inventors: Girish Pimputkar, Stockholm (SE); Per-Erik Pers, Järfälla (SE)

(73) Assignee: Electrolux Home Products Corporation N.V., Brussels (BE)

( * ) Notice: Subject to any disclaimer, the term of this patent is extended or adjusted under 35 U.S.C. 154(b) by 0 days.

(21) Appl. No.: 13/321,337

(22) PCT Filed: May 19, 2010

(86) PCT No.: PCT/EP2010/003091
§ 371 (c)(1),
(2), (4) Date: Jun. 12, 2012

(87) PCT Pub. No.: WO2010/133362
PCT Pub. Date: Nov. 25, 2010

(65) Prior Publication Data
US 2012/0246365 A1 Sep. 27, 2012

(30) Foreign Application Priority Data

May 19, 2009 (EP) .................................... 09006750

(51) Int. Cl.
*G06F 13/12* (2006.01)
*G06F 13/38* (2006.01)

(52) U.S. Cl.
USPC .......................................... 710/62; 709/222

(58) Field of Classification Search
None
See application file for complete search history.

(56) References Cited

U.S. PATENT DOCUMENTS

| 5,477,091 | A | 12/1995 | Fiorina et al. | |
|---|---|---|---|---|
| 6,424,660 | B2 * | 7/2002 | Jacobson, Jr. | 370/475 |
| 6,915,343 | B1 * | 7/2005 | Brewer et al. | 709/224 |
| 8,380,909 | B2 * | 2/2013 | Borchers et al. | 710/263 |
| 2005/0086322 | A1 * | 4/2005 | Park | 709/217 |
| 2005/0184852 | A1 * | 8/2005 | Lee | 340/3.1 |
| 2007/0130487 | A1 * | 6/2007 | Buchner et al. | 714/4 |
| 2009/0083397 | A1 | 3/2009 | Neo et al. | |
| 2009/0112739 | A1 * | 4/2009 | Barassi et al. | 705/28 |

FOREIGN PATENT DOCUMENTS

| EP | 0 716 361 A2 | 6/1996 |
|---|---|---|
| EP | 0 980 165 A2 | 2/2000 |
| EP | 1 887 694 A1 | 2/2008 |
| KR | 10-2005-0065810 A | 6/2005 |
| WO | WO 2009/022211 A1 | 2/2009 |

OTHER PUBLICATIONS

DeNuto, J. V. et al., *LIN Bus and Its Potential for Use in Distributed Multiplex Applications*, SAE Technical Paper Series, Society of Automotive Engineers, No. 2001-01-0072, (2001), 9 pages.

(Continued)

*Primary Examiner* — Elias Mamo
(74) *Attorney, Agent, or Firm* — Alston & Bird LLP

(57) ABSTRACT

A domestic appliance (1) with a bus (2) is disclosed. A plurality of modules (3) are connected to the bus, each controlling an operational component (4). Initial programming of the modules may take place from a single connection point (61). The modules may be configured to control the domestic appliance jointly and non-hierarchically. Suitably, all modules are identical up to content of a data memory provided therein.

13 Claims, 8 Drawing Sheets

(56) References Cited

OTHER PUBLICATIONS

VanZoest, D. et al., *Implementation of a Simulated Washing Machine With an Integrated Control Panel and Intra-Appliance Local Interconnect Network Bus*, [online] [retrieved Jul. 2, 2009]. Retrieved from the Internet: <URL: http://www.duraswitch.com/technology/IATCPaper2002.pdf>. 13 pages.

European Search Report for Application No. EP 09 00 6750 dated Jul. 15, 2009.
International Search Report for Application No. PCT/EP2010/003086 dated Sep. 30, 2010.
International Search Report for Application No. PCT/EP2010/003087 dated Sep. 29, 2010.
Search Report for International Application No. PCT/EP2010/003091 dated Sep. 15, 2010.

* cited by examiner

BUS CONTROL FOR A DOMESTIC APPLIANCE

CROSS REFERENCE TO RELATED APPLICATIONS

This application is a national stage application filed under 35 U.S.C. 371 of International Application No. PCT/EP2010/003091, filed May 19, 2010, which claims priority from European Patent Application No. 09006750.5, filed May 19, 2009, each of which is incorporated herein in its entirety.

TECHNICAL FIELD

The present invention generally relates to a domestic appliance. More particularly, the present invention concerns bus control for domestic appliances.

RELATED ART

Domestic appliances are becoming more and more complex nowadays when efforts are made to improve the efficiency and/or operational capabilities of these domestic appliances. The term "domestic appliance" generally refers to apparatus which are configured to accomplish some housekeeping task, which includes activities such as cooking, food preservation, or cleaning, whether in a household, institutional, commercial or industrial setting. As used herein, the term "domestic appliance" therefore includes but is not limited to apparatus such as dishwashers, washing machines, refrigerators, freezers, clothes dryers, cooking ranges, and microwave ovens that have electrical control of at least some operations or functions of the apparatus. Occasionally, the term white goods is also used among practitioners for these apparatuses.

Generally speaking, improved efficiency and/or operational capability of domestic appliances may be desired in order to reduce energy consumption or other resource consumption (e.g., reduction of dishwashing water in dishwashers). Electrical control of domestic appliances have therefore been used in order to improve efficiency through the use of sensors, e.g., to monitor appliance performance and to provide data to adjust the operational components of the domestic appliance. This can be done in dependence of a previously monitored appliance performance and/or in accordance with a desired operational profile (e.g., turbidity sensors to detect water turbidity in dishwashers, etc.).

At least partly as a consequence of the increased interest for improved efficiency and/or operational capability of domestic appliances, domestic appliance manufacturing or assembly have involved the routing of electrical wiring between a power supply and respective operational components in the domestic appliance that requires the power. Most domestic appliances with electronic control systems have included wiring arrangements utilizing direct connections between one single system controller, or main controller, and the various sensors and actuators.

At the same time, the number of options selectable by the user at a user interface of a particular domestic appliance have increased. Also, the sensors and other devices used to enhance energy and resource efficiency have increased in number and have been made more sophisticated. All in all this has led to an increased amount of wiring in domestic appliances and, as a consequence, the time to install the wiring also increases.

Such assembly techniques may therefore present difficulties with regard to resources used in manufacturing/assembly, such as the wiring to connect each sensor or actuator to the single system controller and the time to install the wiring. Further, as the number of wire interconnects have increased, there is an increased probability of failure of some portion of the wiring for the control system of the domestic appliance.

In order to reduce the amount of wiring, the European Patent No. 0 716 361 (hereinafter the '361 patent) suggests to employ a serial bus control system. In the '361 patent, one single system controller controls all the slave nodes that comprise control sensors/actuators of the household appliance. Such a household appliance could potentially present a risk that all operations or functions that are controlled by the single system controller becomes malfunctioning in the event the system controller, for some reason, breaks down.

SUMMARY OF THE INVENTION

It is with respect to the above considerations and others that the present invention has been made. The present invention seeks to mitigate, alleviate or eliminate one or more of the above-mentioned deficiencies and disadvantages singly or in combination. In particular, the inventors have realized that it would be desirable to achieve a domestic appliance, in which the total amount of wiring used for control system sensors, actuators and the like is reduced as much as possible while maintaining operational reliability of the domestic appliance. It would also be advantageous to achieve a domestic appliance, which allows for enhanced production efficiency, e.g. in terms of the manufacturing/assembly becoming less labour intensive and/or less resource demanding.

To better address one or more of these concerns, a domestic appliances, other apparatus and methods having the features defined in the independent claims are provided. Further advantageous embodiments of the present invention are defined in the dependent claims.

According to an aspect of the invention, there is provided a domestic appliance comprising a bus disposed within the domestic appliance, wherein multiple combined control/connectors are electrically coupled to the bus, and wherein each combined control/connector is electrically connected via the bus to at least one of the other combined control/connectors to thereby power the at least one combined control/connector, and wherein each control/connector is communicatively coupled to a respective operational component of the domestic appliance to thereby control the same, said operational component being associated with a certain operation or function of the domestic appliance.

As used herein, the term "combined control/connector" refers to a device that combines the functions of a connector block and a control unit, or controller. That is, the combined control/connector may be a connector block into which a control unit is integrated.

As used herein, the term "bus" refers to a communications system in which each component is respectively coupled to the same bus such that communications to or from the control/connectors is passed along the same bus. Use of the same bus to communicate with each respective control/connector provides for minimized or at least reduced wiring.

In one embodiment, the bus comprises one single wire. This may provide for serial bus communications. This embodiment may therefore allow for a serial bus control system.

In another embodiment, the bus comprises two or more wires. This may provide for parallel bus communications. This embodiment may therefore allow for a parallel bus control system.

In one embodiment, one of the combined control/connectors is configured to act as a master node and the rest of the combined control/connectors are configured to act as slave nodes. The master node may be adapted for establishing communication between the master node and the slave nodes. Each slave node may be configured to be responsive to at least one of a plurality of slave node address codes so as to generate a slave node response signal to the master node.

As used herein, master/slave is a model for a communication protocol in which one combined control/connector (known as the master) controls one or more other combined control/connectors (known as slaves). It should therefore be appreciated that "master-slave" or similar terminology as used herein refers to a control system in which all communications to respective combined control/connectors acting as slave nodes is initiated by the combined control/connector acting as the master node, that is, each slave node generates signals on the communications bus in response to an inquiry from the master node.

In one embodiment, the above-mentioned bus comprises both a communications bus configured for passage of digital communications signals between the combined control/connector acting as the master node and the combined control/connectors acting as slave nodes, and a power bus configured for providing electrical power to the combined control/connectors.

In still a further embodiment, each multiple combined control/connector comprises a controller configured to control the respective operational component in dependence of an operational profile of the domestic appliance. The operational profile may be user-selectable via a user interface, a.k.a. man-machine interface, of the domestic appliance.

In one embodiment, each combined control/connector comprises a controller configured to sense a condition of the respective operational component and generate control signals to components of the domestic appliance in dependence of the sensed condition.

In one embodiment, the controller comprises a processor and communications module communicatively coupled to the processor, wherein the communications module is configured for passage of a control signal, e.g. generated by the processor, between the combined control/connector and the respective operational component for controlling the operation of said operational component.

In one embodiment, the power bus is configured for providing electrical power to the operational components via the respective combined control/connectors.

The electrical power may, e.g., be high-voltage power.

The domestic appliance may be any appliance from the group comprising: a dishwasher, a washing machine, a refrigerator, a freezer, a clothes dryer, a cooking range, and a microwave oven.

In a preferred embodiment, the domestic appliance is a washing machine. The operational components may, e.g., be any component from the from the group comprising: a motor, a pump, a heater, a sensor, or a valve.

In another preferred embodiment, the domestic appliance is a dishwasher. The operational components may, e.g., be any component from the from the group comprising: a motor, a pump, a heater, a sensor, or a valve.

In contrast to the '361 patent which discloses a serial bus control system using only one single system controller for controlling all operational components (i.e., the actuators/sensors) of the appliance, the various embodiments of the present invention suggest using one control unit (i.e., the combined control/connector) for each operational component of the domestic appliance. To this end, the domestic appliance according to the various embodiments of the present invention includes several (i.e., two or more) control units (in the form of the combined control/connectors), wherein each of these control units is configured to control its own respective operational component. Thus, as compared to the '361 patent, the various embodiments of the present invention suggest an alternative technical solution for reducing the wiring in a domestic appliance. An advantage of having one control unit (in the form of the combined control/connector) for each operational component of the appliance is that there is a reduced risk that all operations/functions of the appliance becomes malfunctioning if only one breaks down. If only one control unit (i.e. one control/connector) breaks down for some reason, then, most probably only the operation/function of the operational component associated with that control unit will stop functioning properly. Since the risk that all combined control/connectors stop working at the same time is relatively low, the risk that all functions/operations of the appliance will become malfunctioning simultaneously is consequently reduced, as compared to the '361 patent.

In a second aspect of the invention, there is provided domestic appliance comprising a bus, to which are connected modules being either:

a power supply module for electrically powering the bus; or a combined control/connector consisting of:

a processing means;

a memory for storing instructions executable by the processing means;

a connecting means communicatively coupled to the processing means and adapted to connect an operational component of the domestic appliance; and additional hardware communicatively coupled to the processing means, which combined control/connector is adapted to communicate with at least one other module via the bus and to interact with the operational component, wherein the domestic appliance comprises at least two combined control/connectors connected to the bus and wherein all combined control/connector have identical processing means, memory, connecting means and additional hardware, and are distinguishable only with respect to memory content.

In a third aspect of the invention, there is provided a combined control/connector, which consists of:

a processing means;

a memory for storing instructions executable by the processing means;

a connecting means for connecting an operational component of a domestic appliance, said connecting means being communicatively coupled to the processing means; and additional hardware communicatively coupled to the processing means, and which is adapted to cooperate with a further module, which is connected thereto via a bus in a domestic appliance to form a network, and which is a further combined control/connector having processing means, memory, connecting means and additional hardware identical to those of the combined control/connector and is distinguishable from said combined control/connector only with respect to memory content.

The second and third aspects are advantageous by virtue of a decreased inventory costs. Their technical features also achieve simplicity of assembly and adaptability to different layouts of the domestic appliance.

In a fourth aspect, the invention provides a method implemented at a combined control/connector for non-hierarchically controlling a domestic appliance comprising a plurality of operational components connected via combined control/ connectors, which are in turn communicatively interconnected via a bus, the method including:

receiving a communication enabling start of an operational phase from a first combined control/connector;

initiating the operational phase by interacting with an operational component connected to said combined control/connector; terminating the operational phase; and transmitting a communication that the operational phase is terminated to a second combined control/connector.

In a fifth aspect, the invention provides a method of non-hierarchically controlling a domestic appliance comprising a plurality of operational components connected via combined control/connectors, which are in turn communicatively interconnected via a bus, the method including the following steps:

at a first combined control/connector:

A1) initiating an operational phase by interacting with an operational component connected to the first combined control/connector;

A2) terminating the operational phase; and

A3) transmitting a communication that the operational phase is terminated to a second combined control/connector;

at a second combined control/connector:

B1) receiving the communication from the first combined control/connector;

B2) initiating, responsive to the communication from the first combined control/connector, an operational phase by interacting with an operational component connected to the second combined control/connector; and B3) terminating the operational phase.

In a sixth aspect, the invention provides a combined control/connector, which comprises:

a processing means; and a connecting means for connecting an operational component of the domestic appliance, said connecting means being communicatively coupled to the processing means, and which is adapted to form a network in a domestic appliance through connection via a bus to at least one further combined control/connector, with which it is adapted to communicate via the bus, wherein said combined control/connector is adapted to cooperate with at least one further combined control/connectors connected to it in order to non-hierarchically control the domestic appliance.

In the fourth, fifth and sixth aspects, the combined control/connectors take turns in controlling the domestic appliance. This provides the advantage of enabling a lean, cost-effective structure of each combined control/connector. In particular, only a limited amount of instructions need to be saved at each combined control/connector, which can therefore be equipped with a memory of moderate size. The same holds true of processing capabilities, for the cooperative execution of the non-hierarchical control distributes the load over the processing means of several combined control/connectors.

In a seventh aspect, the invention provides a combined control/connector, which comprises:

a processing means;

a memory for storing instructions executable by the processing means; and a connecting means for connecting an operational component of a domestic appliance, said connecting means being communicatively coupled to the processing means, wherein the combined control/connector is adapted to form a network comprising at least one further combined control/connector communicatively coupled to it via a bus in a domestic appliance;

and wherein the combined control/connector is adapted, at initiation of the network, to:

i) assume a label identifying an operational component connected to the combined control/connector;

ii) receive, via the bus, a non-specified communication containing instructions executable by the processing means and store these in the memory; and iii) receive, via the bus, a communication which is specified by the label identifying the operational component and contains instructions executable by the processing means and store these in the memory;

and wherein the combined control/connector is adapted, after initiation of the network, to cooperate with a further combined control/connector in the network.

In an eighth aspect, the invention provides a method of initiating a network in a domestic appliance, the network comprising a plurality of combined control/connectors communicatively connected via a bus, wherein each combined control/connector comprises:

a processing means;

a memory for storing instructions executable by the processing means; and a connecting means communicatively coupled to the processing means, for connecting an operational component of the domestic appliance, the method including:

connecting a programming device to the bus;

transmitting, from the programming device and via the bus, a communication causing the combined control/connectors to assume labels identifying operational components connected to the respective combined control/connectors;

transmitting, from the programming device and via the bus, a non-specified communication containing instructions executable by the processing means;

transmitting, from the programming device and via the bus, a communication which is specified by the label of one operational component and contains instructions executable by the processing means of this combined control/connector to which it is connected; and disconnecting the programming device.

Hence, in the seventh and eighth aspects, a combined control/connector is adapted to ignore communications sent via the bus that are specified by labels that do not identify the operational component connected to it. This enables efficient initial programming (downloading of software instructions to combined control/connectors), because a common portion of the software can be distributed to all combined control/connectors at once, while the individual portions, specific for each combined control/connector (e.g., specified in terms of the operational component connected thereto) is distributed in another phase of the programming. The communications used for distributing the respective software portions are either non-specific (common portion) or specified in order to be stored at the relevant combined control/connectors. Further, programming can be carried out by connecting a programming device to a point on the bus, from which all connected combined control/connectors can be communicated with.

Generally, the various embodiments of the invention may exhibit the same or similar advantages.

These advantages and/or other aspects of the invention will be apparent from and elucidated with reference to the illustrative embodiments described hereinafter.

Generally, all terms used herein are to be interpreted according to their ordinary meaning in the technical field, unless explicitly defined otherwise herein. All references to "a/an/the [element, device, component, means, step, etc.]"

are to be interpreted openly as referring to at least one instance of the element, device, component, means, step, etc., unless explicitly stated otherwise. It should also be emphasized that the term "comprise(s)/comprising" or "include(s)/ including" when used herein is taken to specify the presence of stated features, integers, steps or components but does not preclude the presence or addition of one or more other features, integers, steps, components or groups thereof.

BRIEF DESCRIPTION OF THE DRAWINGS

Embodiments of the present invention will now be described in more detail, reference being made to the enclosed drawings, on which.

DETAILED DESCRIPTION OF EMBODIMENTS

I

The present invention will now be described more fully hereinafter with reference to the accompanying drawings, in which exemplifying embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Furthermore, like numbers refer to like elements throughout.

Figure 1:
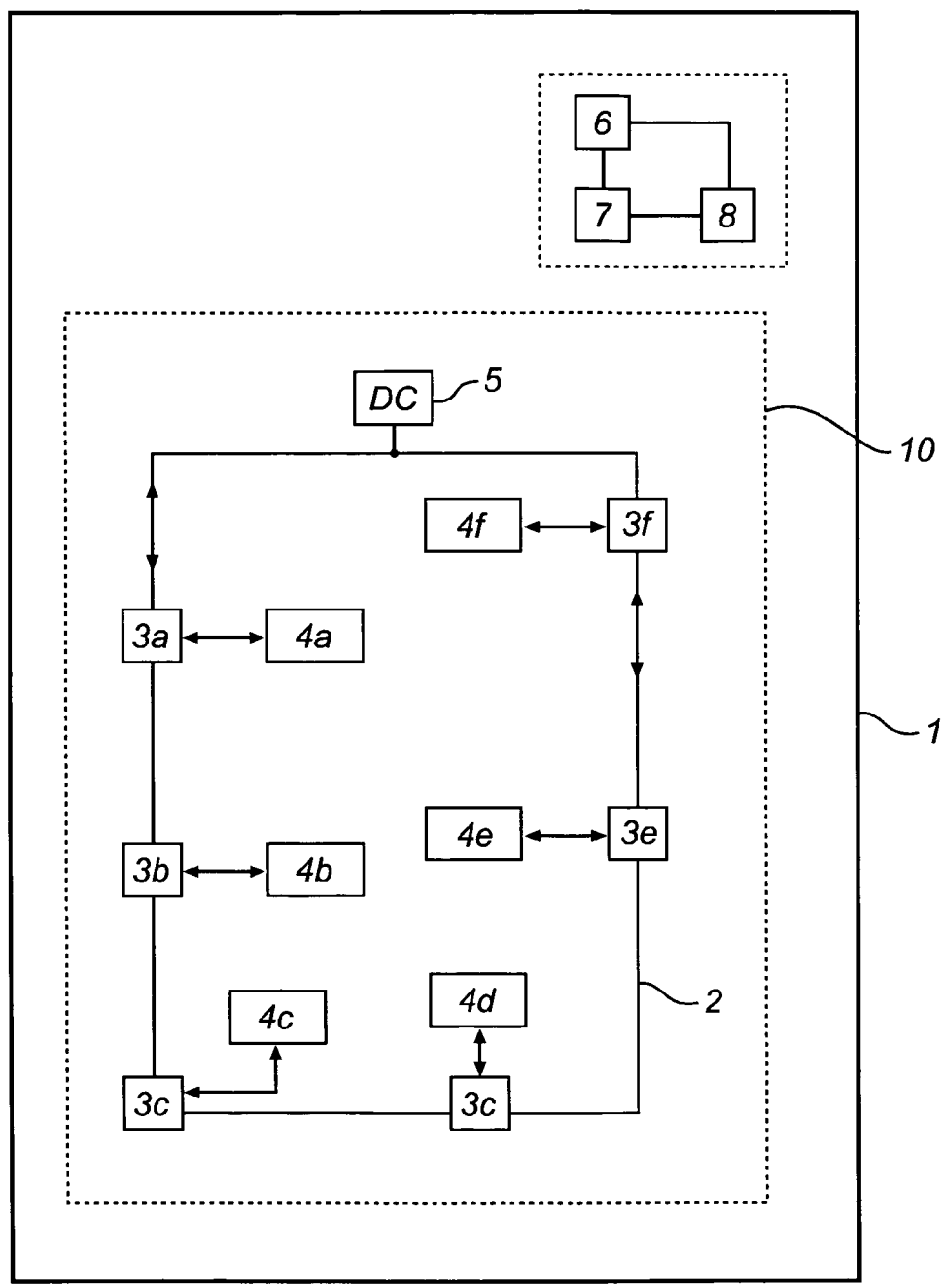
FIG. 1 is block diagram of a domestic appliance bus control system in accordance with an embodiment of the invention.

Referring to FIG. 1, there is illustrated (in phantom) a domestic appliance 1 according to an exemplary embodiment of the invention. As already described hereinabove, various embodiments of the present invention can be employed in various types of domestic appliances 1. To this end, the domestic appliance 1 illustrated in FIG. 1 may be a dishwasher, a washing machine, a refrigerator, a freezer, a combined refrigerator/freezer, a clothes dryer, a cooking range, a microwave oven, or the like.

As outlined in the exemplifying embodiment shown in FIG. 1, the domestic appliance 1 may comprise a bus control system 10. As can be seen in FIG. 1, a bus 2 is disposed within the domestic appliance 1. Multiple, i.e. two or more, combined control/connectors 3a, 3b, 3c, 3d, 3e, 3f are electrically coupled to the bus 2. Each combined control/connector 3a, 3b, 3c, 3d, . . . is electrically connected or coupled via the bus 2 to one or several of the other combined control/connectors 3a, 3b, 3c, 3d, . . . . For example, the combined control/ connector 3a is electrically connected to the combined control/connector 3b, whereas the combined control/connector 3b is electrically connected to both the combined control/ connectors 3a and 3c. Furthermore, each of the combined control/connectors 3a, 3b, 3c, 3d, . . . is communicatively coupled to a respective operational component 4a, 4b, 4c, 4d, 4e, 4f for controlling the same. For instance, the combined control/connector denoted 3d is communicatively coupled to the operational component denoted 4d.

The operational components 4a, 4b, 4c, 4d, . . . are associated with a respective operation and/or function of the domestic appliance 1. In other words, an operational component 4 is a component that controls an operation and/or function of the domestic appliance 1. Operational components 4 may include sensors or actuators or a combination thereof. Examples of sensors include temperature sensors, pressure sensors, ambient condition sensors, turbidity sensors, motor load sensors, mechanical component position sensors, etc. Actuators include control relays, triacs or similar switching components, etc. Examples of actuators may thus include control relays for operating a motor, for opening/closing a valve, lighting elements in the domestic appliance, etc. Examples of combination sensor/actuator devices include damper drive motors, and temperature or humidity sensors coupled to fan speed sensors.

It should be readily understood that the number of and types of sensors and/or actuators used in a particular domestic appliance 1 depends on the type of domestic appliance 1. For example, if the domestic appliance 1 is a dishwasher, the dishwasher may include one or several sensors (e.g., a turbidity sensor for measuring the cleanliness of the dishwashing water), a control relay for operating a motor, a control relay for operating an inlet/outlet valve, a control relay for operating a heater, etc. The number of and types of sensors and/or actuators used in a particular domestic appliance 1 also depends on specific end-customer needs and therefore the exact number and/or types of operational components 4 has to be tested and evaluated for each specific use case.

In the exemplifying embodiment illustrated in FIG. 1, the bus 2 comprises two or more wires, with one wire providing a power source, such as a direct-current (DC) source, to power the combined control/connectors 3 and one wire providing a bi-directional communications path between the various combined control/connectors 3. In such embodiment, the DC power supply wire of the bus 2 can be coupled to a DC power supply 5. The DC power supply 5 may be a high-voltage DC power supply. As can be further seen in FIG. 1, the bus 2 is arranged in a loop in the appliance 1 and the various combined control/connectors 3a, 3b, 3c, 3d, . . . are arranged at intermediate positions along the loop.

The domestic appliance 1 of the exemplary embodiment shown in FIG. 1 further comprises a control device 6 or the like such that a user can operate the domestic appliance 1. The control device may comprise or be communicatively connected to a user interface (UI) 7. If communicatively coupled as illustrated in FIG. 1, the communication between the control device 6 and the UI 7 may be performed in a wireless or wired (not shown) fashion. The control device 6 may further be connected to a processing unit 7 comprising a data source 8, such as hard drive, a memory unit, a flash memory, etc.

from which data source 8 various pre-stored operational profiles of the domestic appliance 1 are selectable. The control device 6 is configured to generate control signals and communicate control signals, e.g. in dependence of a selected operational profile selected by a user via UI 7, to the combined control/connectors 3. The communication between the control device 6 and the combined control/connectors 3 may be performed in a wireless or wired (not shown) fashion.

In accordance with the exemplary embodiment of the invention as embodied in FIG. 1, one of the combined control/connectors, e.g. the combined control/connector denoted 3a, is configured to act as a master node, hereinafter referred to as the "master control/connector". The rest of the combined control/connectors 3b, 3c, 3d, . . . are configured to act as slave nodes, hereinafter referred to as "slave control/connector(s)". A slave control/connector can in principle comprise the same units, or components, as the master control/connector. However, only one of the combined control/connectors 3a is configured to act as a master node, i.e. set in a master mode. The other combined control connectors 3b, 3c, 3d, . . . , are set in a slave mode, i.e. these combined control/connectors are configured to act as slave nodes. The master/slave relationship (i.e. which of the combined control/connectors to set in a master mode or slave mode) can be established during manufacturing/assembly of the domestic appliance 1. Accordingly, the master/slave relationship can be established during manufacturing/assembly of domestic appliance 1. Once the master/slave relationship has been established, the direction of control is from the combined control/connector acting as master to combined control/connector(s) acting as the slave(s). The communication between the control device 6 and the control/connectors 3a, 3b, 3c, 3d, . . . is advantageously via the control/connector 3a that is acting as the master node.

In the exemplifying embodiment shown in FIG. 1, the bus 2 comprises a communications bus configured for passage of digital communications signals between the master control/connector 3 and the slave control/connectors 3, and a power bus configured for providing electrical power to the combined control/connectors 3. The communications bus may also be configured for passage of a control signal between the combined control/connector 3 and its respective operational component 4 for controlling the operation of said operational component 4. Furthermore, the power bus may additionally be configured for providing electrical power to said operational component 4 via the respective combined control/connector 3.

Figure 2:
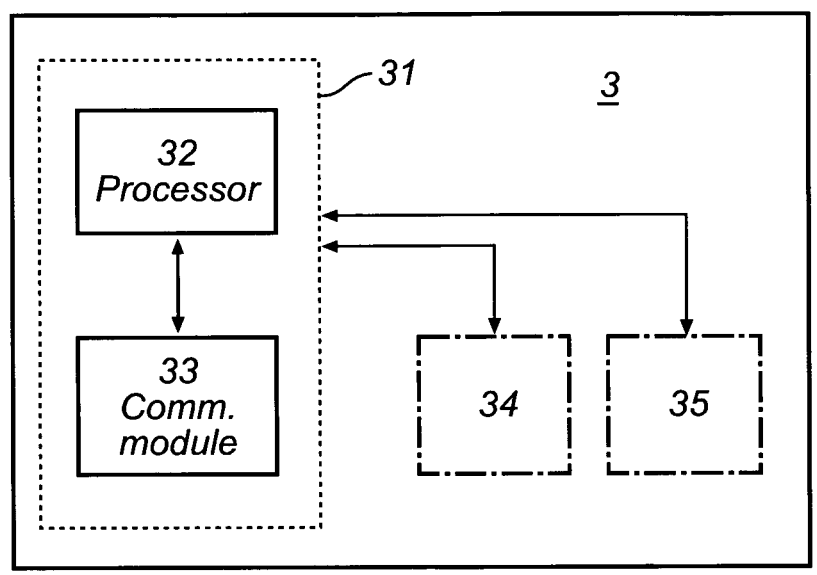
FIG. 2 is a functional block diagram of an embodiment of a combined control/connector.

FIG. 2 is a functional block diagram of an exemplary embodiment of a combined control/connector 3.

In the exemplifying embodiment of FIG. 2, the combined control/connector 3 comprises a controller 31. The controller 31 can be configured to control the respective operational component 4 in dependence of an (possibly user-selected via UI 7) operational profile of the domestic appliance 1. Still further, the controller 31 can be configured to sense a condition of the respective operational component 4 and generate control signals to components of the domestic appliance 1 in dependence of the sensed condition.

In the exemplifying embodiment of FIG. 2, the controller 31 comprises a processor 32 and communications module 33 communicatively coupled to the processor 32. The communications module 33 may be configured for passage of a control signal between the combined control/connector 3 and its respective operational component 4 for thereby controlling the operation of its respective operational component 4.

The various combined control/connectors 3 may in principle be identical from a hardware perspective. However as described hereinabove, from a functional perspective they differ in that one of the combined control/connectors 3 is configured to act as a master control/connector and the rest of the combined control/connectors 3 are configured to act as slave control/connectors. In other words, one of the combined control/connectors is in a master mode and the others are in a slave mode.

If the combined control/connector 3a is configured to act as the master, the communications module 33 is adapted for initiating or establishing communication with one or more of the combined control/connectors 3 that are configured to act as slave nodes. For example, the communications module 33 may be configured for generating digital address code signals to access selected slave control/connectors 3b, 3c, 3d, . . . . The communications module 33 may also be configured for passing transmissions received from any of the slave control/connectors 3b, 3c, 3d, . . . to the processor 31 of the master control/connector 3.

Each slave control/connector 3b, 3c, 3d, . . . has a predefined digital address code (which has, e.g., been assigned at manufacturing or assembly) When the master control/connector 3a transmits the digital address code, communication between the master control/connector 3a and the slave control/connector 3b, 3c, 3d, . . . associated with said code address can be established. Typically, the various slave control/connectors 3b, 3c, 3d, . . . have respective slave node addresses, such that when the master control/connector 3a transmits a certain code address this causes the slave control/connector, e.g. 3b, associated with that certain code address to respond. The slave control/connectors 3b, 3c, 3d, . . . nodes are responsive to at least one of a plurality of slave node address codes so as to generate a slave node response signal to the master node 3a. This can be done directly to the combined control/connector 3a acting as the master or, alternatively, via one or more of the other slave nodes 3c, 3d, 3e, . . . along the loop of the bus 2.

The processor 32 of each combined control/connector is adapted to receive data signals from the other combined control/connectors 3 (via the respective communications modules 33) and generate control signals for the respective operational components 4a, 4b, 4c, 4d, . . . to control domestic appliance 1 operation. The communications modules 33 of each combined control/connector 3 is communicatively coupled, either in a wired or a wireless fashion, to a respective operational component 4 such that said operational component can be controlled e.g. in dependence of a measured parameter and/or in accordance with a specific operational profile. The processors 32 of the various combined control/connectors 3 may also comprise clock circuitry for coordinating exchange of data along the bus 2. The processors 32 may additionally comprise various applications or programs on its microprocessor chip. These various applications or programs may selectively control the rate of updating information from various operational components 4, which are communicatively coupled to the various combined control/connectors 3. Different sampling rates, e.g. collection of data from the various operational components 4, can be used different modes of appliance operation, e.g., depending on particular user needs.

In some embodiments, one or several of the multiple combined control/connectors 3 may additionally comprise a power down module 34, or circuitry, for reducing energy consumption of the domestic appliance 1 when the domestic appliance is in an idle state/condition. The power down module/circuitry may be configured to shut off associated operational components 4 (e.g. turbidity sensors) during the periods when the domestic appliance 1 (e.g. dishwasher) is not in use.

Still further, in some embodiments one or several of the multiple combined control/connectors 3 may comprise applications for shutting off the respective operational component 4 if the operational component 4 has not been addressed by the user interface 7 for a pre-determined period of time. This may provide for a domestic appliance 1 with a "fail-safe" mode of operation.

In still a further embodiment, one or several of the combined control/connectors 3a, 3b, 3c, 3d, . . . comprises a diagnostics module 35 for monitoring or checking appliance condition for the purposes of analyzing and diagnosing operational components 4a, 4b, 4c, 4d, . . . in need of repair. The diagnostics module 35 can be configured to generate commands directly to the respective operational component 4a, 4b, 4c, 4d, . . . for requesting a response signal from the operational components 4a, 4b, 4c, 4d, . . . when it is desired to check the operational component.

It should be appreciated that the various above-mentioned modules of the combined control/connectors 3 illustrated in FIG. 2, such as the communications module 33, can be realized by hardware or software or a combination of both hardware and software.

Figure 3:
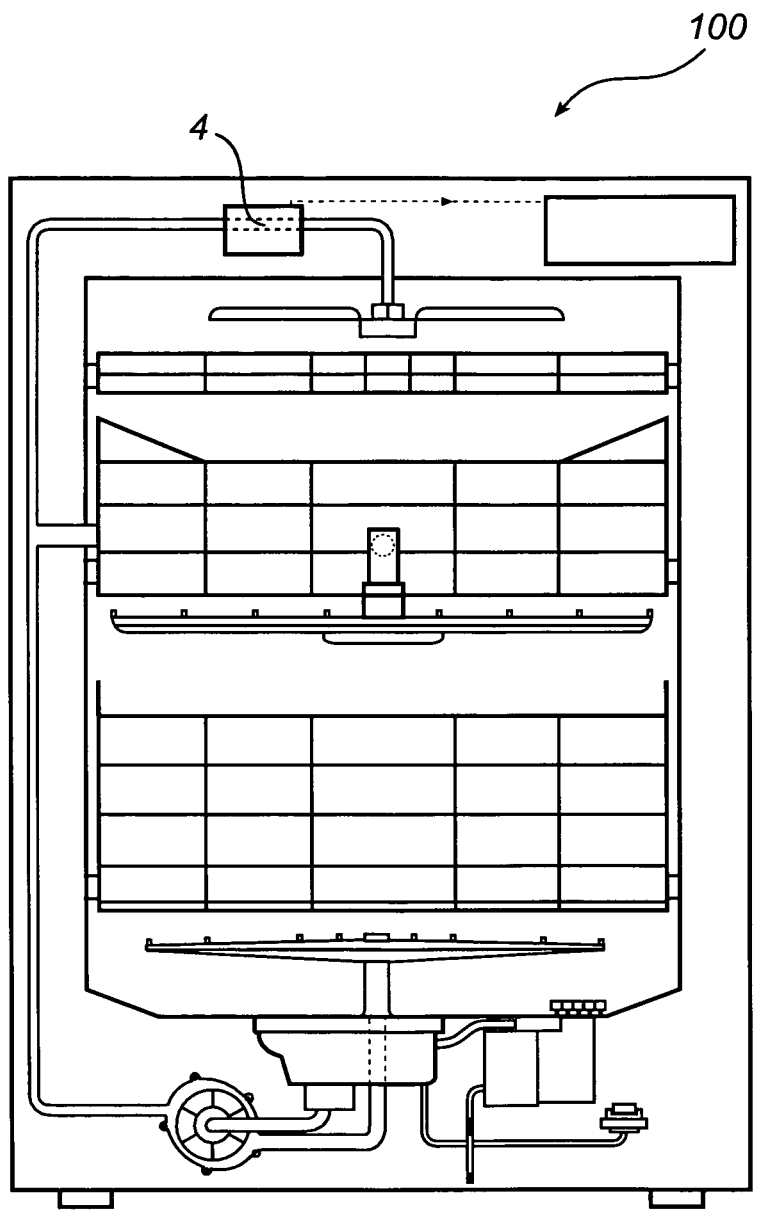
FIG. 3 is a cross-sectional view of a dishwasher being provided with an operational component in the form of a turbidity sensor in the fluid circulation system for detecting the degree of contamination of the fluid.

Example: With reference to FIG. 3 and by way of example and not limitation, the bus control system 10 (see FIG. 1; not shown in FIG. 3) can be disposed within a dishwasher 100. In the dishwasher 100, the bus control system provides for user inputs via the user interface (not shown in FIG. 3) to control water temperature and corresponding operational components (for hot and cold water) to control the dishwashing water supply to provide the desire temperature. Still further, operational components such as a turbidity sensor 4 or the like can be used to sense the water cleanliness and, accordingly, determine the proper length of washing cycles, timing for the addition of detergent, etc. Moreover, operational components such as speed sensors can similarly provide further input for dishwasher control.

II

In advantageous embodiments of the invention, which are shown in FIG. 4, a domestic appliance 1 comprises a bus 2 having connected to it a plurality of combined control/connectors 3, which are identical with respect to one another, and at least one power supply module 5. The combined control/connectors 3 comprise connecting means 30 for connecting an operational component 4 of the appliance 1. Examples of combined control/connectors 3 are shown in FIG. 4 and will be discussed in more detail below. Examples of power supply modules 5 are shown in FIG. 5 and will be discussed below.

Figure 4A:
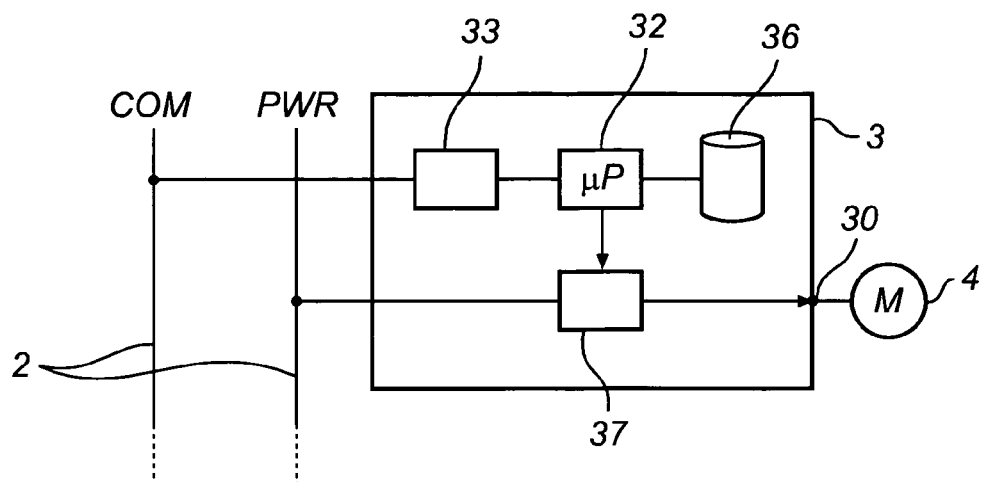
FIG. 4 contains generalised block diagrams showing four combined control/connectors according to embodiments the invention.

FIG. 4a shows a combined control/connector 3 for use with a two-line bus 2 comprising a data line COM and a power line PWR. The combined control/connector 3 includes a number of communicatively coupled functional sections: a processing means 32 (such as a microprocessor, a computer, an field programmable gate array, FPGA, or the like), a communication interface 33 for connection of the processing means 32 to the data line COM, a memory 36 (such as a semi-conductor memory, preferably of a non-volatile type), a connecting means 30 (e.g., a terminal providing ohmic connection) and a controllable switching means 37 (e.g., at least one optocoupler, transistor, thyristor, triac or relay) operable to connect the connecting means 30 and the power line PWR of the bus 2. It is stressed that each functional section can be embodied as several physical units, and one physical unit may be responsible for carrying out more than one function. In FIG. 4a, the connecting means 30 connects an operational component exemplified by a motor 4. The communication interface 33 is adapted to transmit and receive communications over the data line COM of the bus 2. The combined control/connector in FIG. 4a is adapted to power the motor 4 and not to receive any signal from its environment except for the bus 2. In this and most other figures, earthing, fuses and other implementation details which are evident to the person skilled in the art have been omitted for the sake of clarity.

Figure 5A:
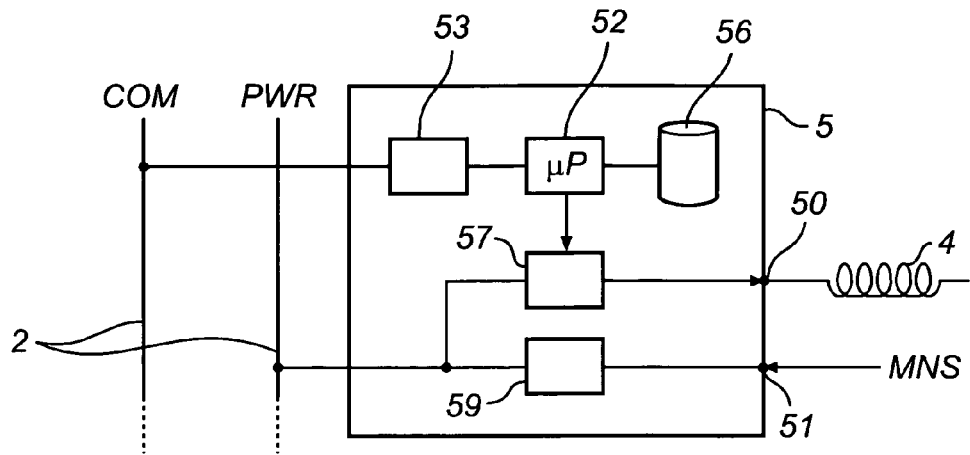
FIG. 5 contains generalised block diagrams showing four power supply modules according to embodiments of the invention.

FIG. 5a shows a power supply module 5 for use with a two-line bus 2 as shown in FIG. 4a. The power supply module 5 comprises a communication interface 53, a second processing means 52, a memory 56 and a controllable switching means 57, each of which may embodied as a corresponding unit in the combined control/connector 3 shown in FIG. 4a. The controllable switching means 57 is connected via an output connecting means 50 to an operational component adapted to be driven at comparatively large current, this fact being exemplified by a heating element 4. The communication interface 53 is shown connected to the data line COM. To the power line PWR are connected the controllable switching means 57 and, parallel thereto, a voltage converter 59 connected to electric mains MNS (or, more generally, a voltage driving the domestic appliance) via an input connecting means 51. The voltage converter 59 may include a rectifier and/or a voltage transformer so as to output electric power at a bus voltage, preferably lower than the electric mains. To allow the heating element 4 to be powered at high current, it may be suitable to select a relay rather than a thyristor-based device as controllable switching means 57.

If more than one power supply module 5 according to FIG. 5a are connected to the bus 2, it is not necessary that all of these are connected to electric mains. The non-connected power supply modules 5 will be powered by the connected ones via the power line PWR of the bus 2.

In this embodiment, the network comprises combined control/connectors 3 and power supply modules 5. All combined control/connectors 3 have identical hardware but may differ in terms of the information stored in their respective memories 36. Further, all power supply modules, if several are provided, have identical hardware in this embodiment; if they differ at all, it is with respect of their memory content only.

Figure 4B:
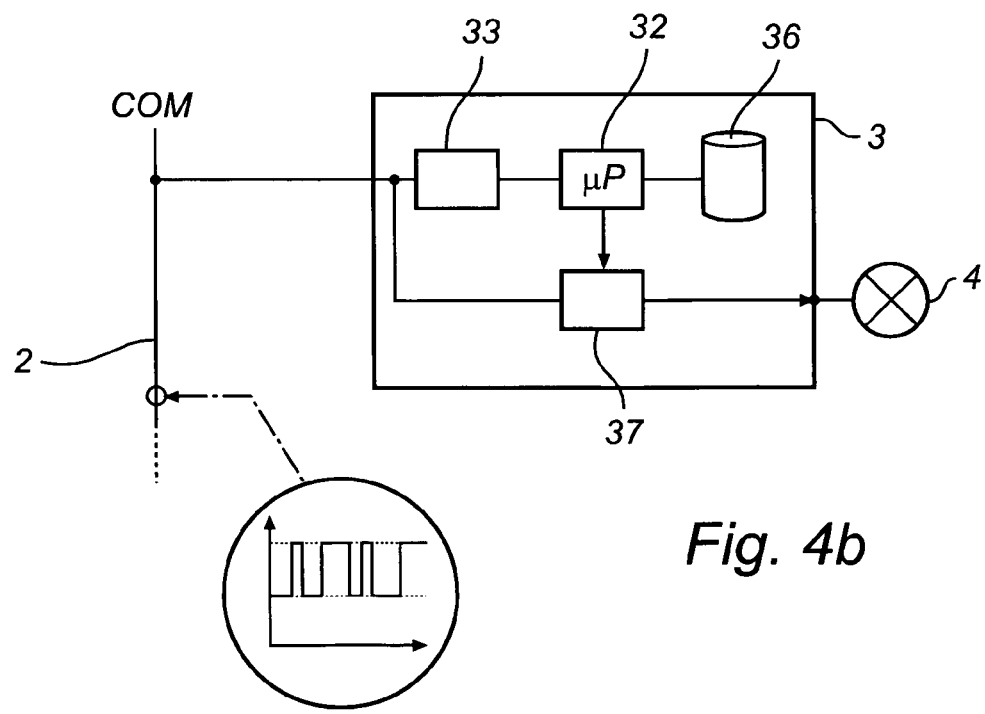

FIG. 4b shows a combined control/connector 3 for use with a one-wire bus 2, comprising only a data line COM. Because the binary "low" value used in the bus 2 is greater than ground voltage (e.g., a few volts may be suitable in a domestic appliance), the data line COM can be used both for transmission of information and for powering operational components 4 connected to this and other instances of the combined control/connector 3. Preferably, the power supply module (not shown) responsible for powering the bus admits that a current above normal signalling current intensity be drawn from the bus 2. In this embodiment, the communication interface 33 is adapted to store electric energy so that it is able to transmit communications over the bus 2 by intermittently raising the potential of the data line COM from the binary "low" value to the binary "high" value. In a variation to the embodiment discussed previously in this section, the combined control/connector 3 of FIG. 4b may replace that of FIG. 4a. However, there is still identity up to memory content of the combined control/connectors 3 in the network.

Figure 4C:
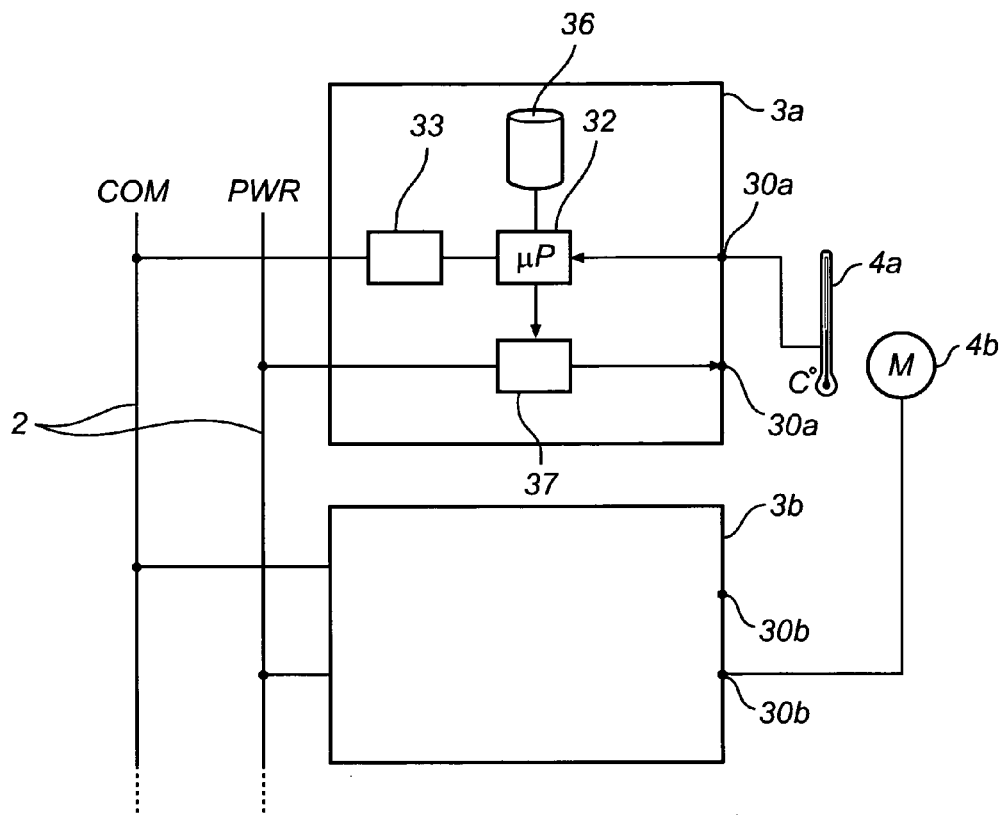

FIG. 4c shows another combined control/connector 3 which may serve as a replacement in another variation to the above embodiment. FIG. 4c more precisely shows two instances of a combined control/connector 3 which includes the sections of the combined control/connector of FIG. 4a, wherein the connecting means 30 includes both a powering terminal for supplying electric energy and a sensing terminal for receiving a signal from an operational component. The powering terminal is connected to the controllable switching means 37, whereas the sensing terminal is connected to the processing means 32. The sensing terminal may receive a signal indicative of a physical or chemical state of the operational component. On the drawing, a powering terminal of a first combined control/connector 3b is connected to a motor 4b, while a sensing terminal 30a of a second combined control/connector 3a is connected to a thermometer 4a arranged to sense the current temperature of the motor 4b. In all other respects, except possibly for memory content, the two combined control/connectors 3 are identical as regards hardware.

Figure 4D:
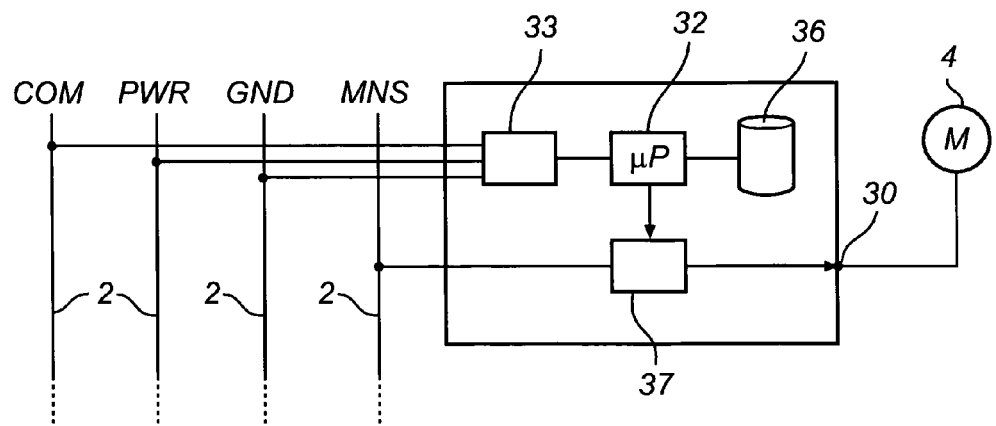

FIG. 4d shows yet another combined control/connector 3, capable of replacing any of those previously discussed in association with a four-line bus 2. More precisely, the bus 2 comprises a data line COM, a signal-power line PWR, a signal earthing line GND and an electric mains line MNS, the latter supplying higher-voltage electric power, such as 230 V AC. The communication interface 33 is in this case connected to the data COM, signal-power PWR and earthing GND lines. The signal-power line PWR powers the combined control/connector 3 itself but not primarily the operational component 4 connected thereto. Instead, the latter is powered directly from the mains line MNS via the controllable switching means 37. The powering at mains voltage is in principle not restricted to high-power operational components; in practical circumstances it is sometimes advantageous to power all operational components in a domestic appliance at the same voltage.

Figure 5B:
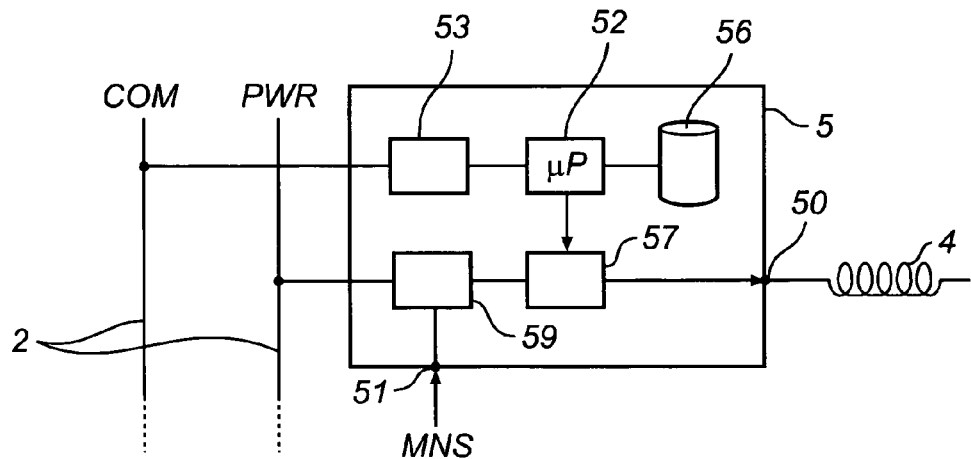

FIG. 5b shows an alternative to the power supply module 5 shown in FIG. 5a and capable of replacing this in a network in a domestic appliance 1. In the power supply module 5 of FIG. 5b, the voltage converter 59 has two different outputs, one connected with the power line PWR of the bus 2 and one connected with the controllable switching means 57. Hence, the voltage converter 59 may supply two different voltages, one bus voltage and one voltage suitable for driving the high-power operational component connected to the power supply module, which is here exemplified by a heating element 4. With the circuit topology shown in FIG. 5b it is only possible to power the operational module if the input connecting means 51 of the power supply module 5 is connected to electric power.

Figure 5C:
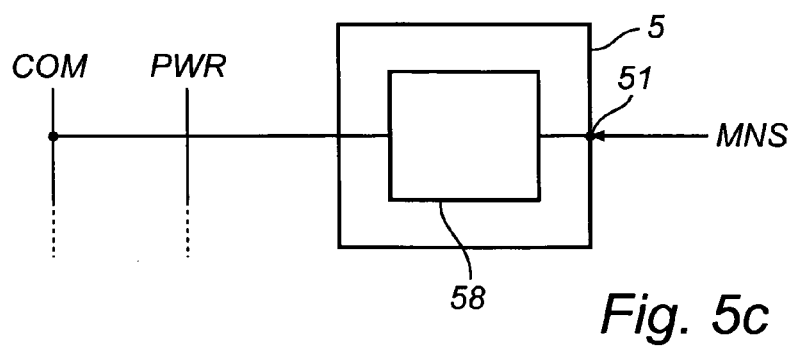

FIG. 5c shows a simple embodiment of a power supply module 5, which does not power any operational component connected to the module and therefore is devoid of processing means and related entities. The power supply module 5 comprises a voltage converter 58 serving the only purpose of powering bus. The voltage converter 58 is in turn powered by electric mains power MNS connected to it via an input connecting means MNS.

Figure 5D:
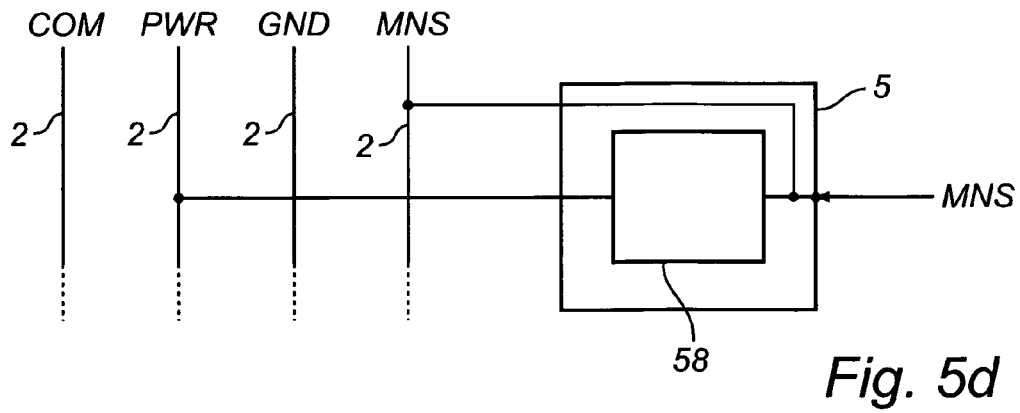

FIG. 5d shows a power supply module 5 similar to that of FIG. 5c, however adapted for use with a four-line bus 2. The structure of the bus 2 has already been explained above in connection with FIG. 4d.

As a further alternative (not appearing on the drawings), any of the combined control/connectors 3 shown in FIG. 4 may include a voltage converter for powering the power line PWR of the bus 2. Similarly to the power supply module 5 of FIG. 5a, all the combined control/connectors 3 in the domestic appliance include such a voltage converter but not all are connected to electric mains. Indeed, it may be sufficient to connect only one of the combined control/connectors 3 to electric mains. As a consequence, the network around the bus 2 may be devoid of power supply modules 5, thus comprising combined control/connectors 3 only.

It is preferred that communication over the bus 2 takes place asynchronously. Thus, no clock pulse generator is necessary and no dedicated clock line for this purpose is required in the bus 2. As is well-known to those skilled in the art, asynchronous communication includes use of start bits or the like at the beginning of communications. A comparatively large portion of the bits transmitted over the network may be spent on start bits, which in practice represents a negligible disadvantage in a domestic appliance considering the limited quantities of information involved.

While synchronization is catered for by start bits and the like in asynchronous communication, it may still be suitable to calibrate the combined control/connectors 3 with respect to their clock frequency. In a preferable embodiment, the processing means 32 of all network modules includes an oscillator which can be calibrated by adjusting the value of trim registers therein. The calibration may take place at the beginning of a work cycle. As one example, in a network comprising one power supply module 5 and a plurality of combined control/connectors 3, the power supply module 5 emits a series of pulses at predetermined frequency at the beginning of a work cycle. Each combined control/connectors 3 receives the sequence of pulses and compares their frequency with the frequency of its own oscillator. If a difference is found to exist, the combined control/connector 3 modifies its trim register values so as to compensate for this.

III

In an embodiment of the present invention, a plurality of modules interconnected by a bus, particularly combined control/connectors, are adapted to control the operational components of a domestic appliance in a non-hierarchical fashion. All modules have equal authority to take measures and decisions, and the responsibility for advancing a predefined programme shifts between different modules in different phases of the programme. In particular, the programme may include a sequence of phases, the transitions between which are made dependent on conditions pertaining to measured values, component status, user inputs or other observations. According to this embodiment, not all decisions as to whether such conditions are fulfilled are taken by one single module, but decisions relating to different conditions may be the responsibility of several different modules. Likewise, if the initiation and/or termination of some phases is conditional on the expiry of a predetermined time period, all modules in the network are equally capable and eligible for measuring this time period and for causing the programme to shift to the subsequent phase after the time period.

Figure 6:
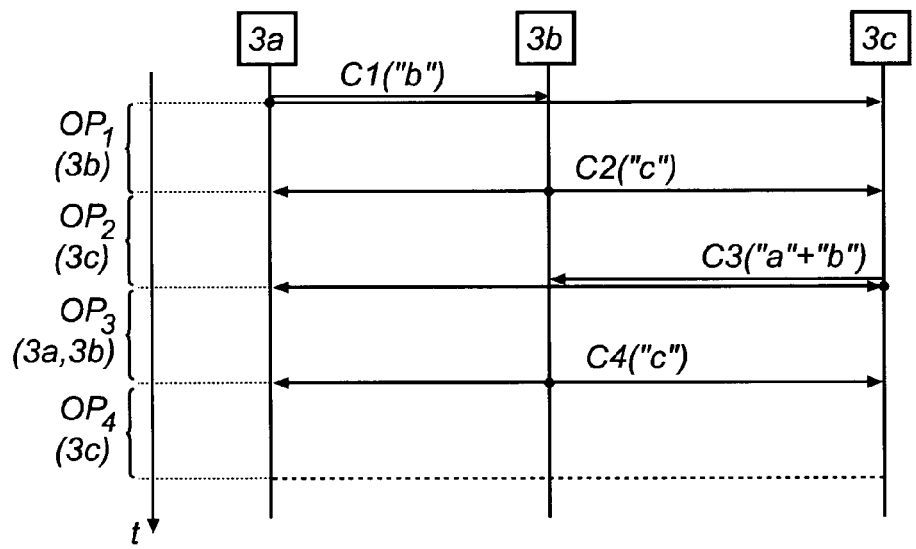
FIG. 6 is a generalised block diagram of a domestic appliance according to an embodiment of the invention, wherein the appliance comprises a network adapted to be initiated by means of a programming device.
Figure 6:
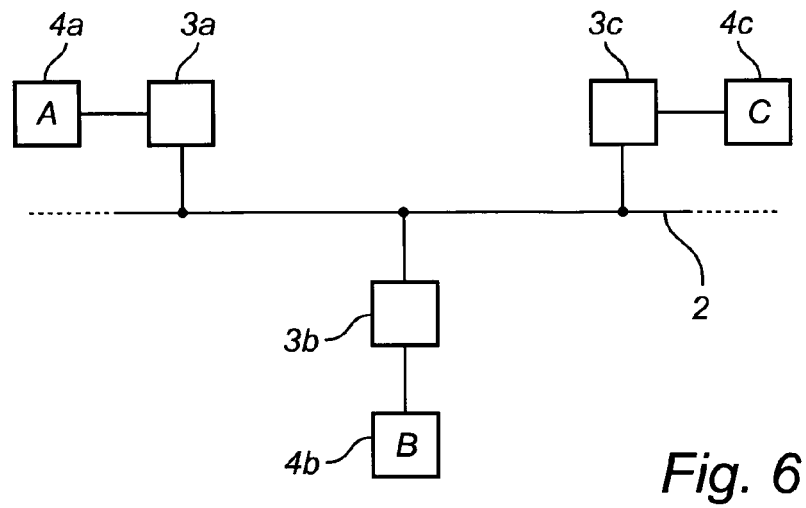

FIG. 6 includes a signalling diagram showing, with respect to time (vertical axis), the exchange of communications between combined control/connectors 3 in a network in a domestic appliance, part of which is shown below the signalling diagram. Three operational components 4, labelled "A", "B" and "C", are connected to respective combined control/connectors 3a, 3b and 3c. Each combined control/connector 3 is associated with a label identifying the operational component 4 to which it is connected. Communications over the network are transmitted to all combined control/connectors 3 but may be specified by a label indicating the combined control/connector 3 from which it requires action. The other combined control/connectors 3 may then ignore the communication.

In the signalling diagram at the top of the figure, four operational phases OP1, . . . , OP4 are indicated. In the first phase OP1, the B component is active; in the second phase OP2, the C component is active; in the third phase OP3, the A and B components are active; and in the fourth phase OP4, the C component is active. In this example, each operational phase is initiated by transmission of a communication over the network.

Thus, a first communication prior to the first operational phase OP1 is sent over the bus 2 to all network modules, but is specified by the label "B" and thereby activates the second combined control/connector 3b. In accordance with processor-executable instructions stored in the memory of the second combined control/connector 3b, the first communication initiates the first operational phase OP1. The instructions further specify that the first operational phase OP1 involves activity of the B operational component 3b and is to end a after a predetermined time period, which is when the C component 3c is to be activated. Thus, after the first operational phase OP1, the second combined control/connector 3b transmits a communication specified for the third combined control/connector 3c, which will thus be ignored by the first combined control/connector 3a. The second operational phase OP2 is initiated by the third combined control/connector 3c and is an idle period in which the C component 3c, which in this example is an input means, awaits input from a user. When the third combined control/connector 3c decides that the input has been received, it transmits a communication to the effect that the first and second combined control/connectors are activated jointly. More precisely, this third operational phase OP3 involves that the B component 3b is operated in a feedback fashion with respect to an output parameter measured by the A component 3a. For instance, the B component 3b may be a radiator and the A component 3a a thermal sensor arranged in a space heated by the radiator. The feedback operation of the B component 3b may proceed for a predetermined time period (including intermittent powering of the heater so that a predetermined fixed or evolving temperature is achieved) or, as an alternative, until the heated space has reached a predetermined time period (including, possibly, constant powering of the heater until the temperature condition is fulfilled). In neither case is there any preference a priori regarding whether the A component 3a or B component 3b should make the decision when to terminate the third operational phase OP3, for the processing means 32 of both combined control/connectors 3 are identical and include a time measuring means (e.g., an oscillator) and the information contained in the thermal sensor signal received by the first combined control/connector 3a may be forwarded to the second combined control/connector 3b over the bus 2. The information may be forwarded in the form of bus communications (not shown) which, unlike the first, second and third communications, do not cause initiation of an operational phase; they constitute a mediation of information. In the example shown in the figure, the second combined control/connector 3b is responsible for terminating the third operational phase OP3. After the termination, the second combined control/connector 3b transmits a fourth communication labelled for the third combined control/connector 3c, which is programmed to initiate a fourth operational phase OP4 after receipt of this communication. The fourth operational phase OP4 is the final phase in the work cycle, and the instructions stored in the memory of the third combined control/connector 3c does not cause it to transmit any communication at the end of the phase.

In the context of applications of the present invention, an operational phase may include controlling an operational component and transmitting information to a component (e.g., an indicator forming part of a user interface) in addition to the actions of powering a component, receiving information from a component and performing feedback control of a component, as discussed in the previous example. The interactions between the combined control/connectors 3 and their connected operational components 4 constitute a joint and non-hierarchic control of the domestic appliance 1.

As discussed above, it is advantageous to equip all combined control/connectors in a uniform, preferably identical, fashion as regards their hardware. They may be personalised and distinguished in terms the content of their memory, that is, the processor-executable instructions governing the interactions between groups of combined control/connectors and between a combined control/connectors and an operational component of the domestic appliance.

IV

The following paragraphs disclose advantageous procedures of manufacture of domestic appliances in accordance with embodiments of the present invention. In particular, programming (download of software, that is, processor-executable instructions) of several network modules effected from one easily accessible connection point in the network. Preferably, it is possible to download software to all network modules (including both combined control/connectors and power supply modules) by connecting a programming device to a service connection point arranged at the bus. The software allows the network modules to cooperate in order to control the domestic appliance. Advantageously, the network modules control the domestic appliance non-hierarchically as described above.

Figure 7:
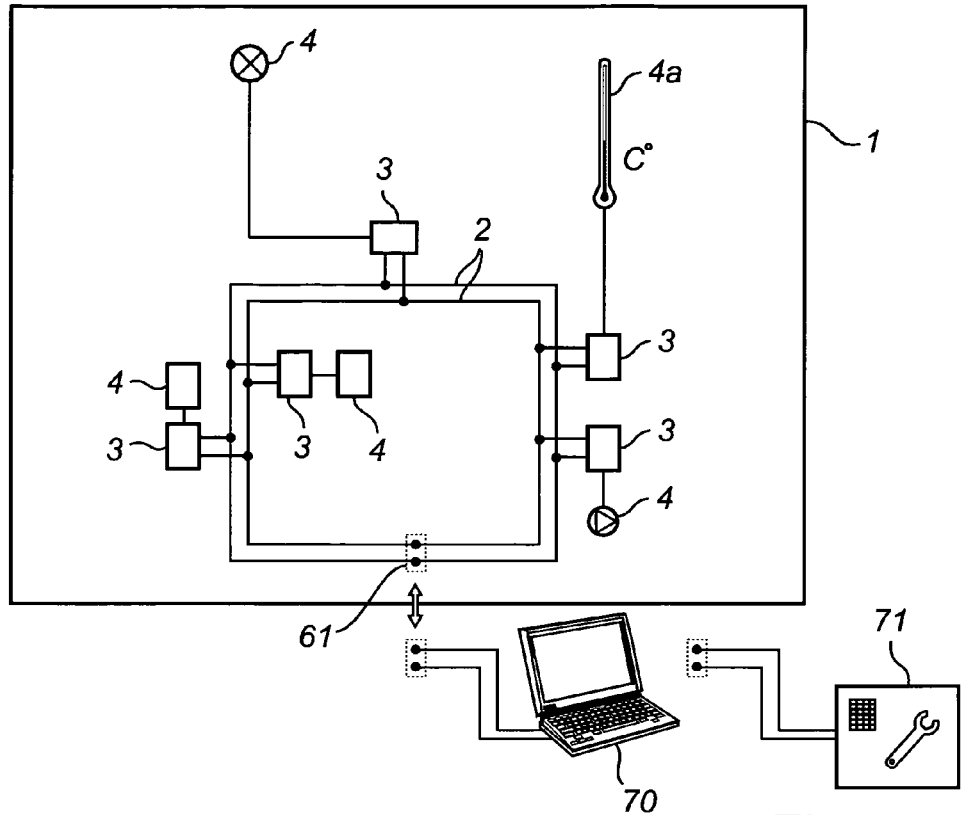
FIG. 7 includes, on the one hand, a generalised block diagram of a bus network comprising combined control/connectors and operational components connected to these and, on the other hand, a signalling diagram showing the communications exchanged at different points in time between the combined control/connectors.

FIG. 7 shows a domestic appliance 1 having a bus 2 to which are connected five combined control/connectors 3, each having an associated connected operational component 4. Each of the combined control/connectors 3 (and, in embodiments where such are provided, each power supply module) has a hardware structure allowing it to cooperate with similar modules, namely the structure discussed in connection with FIGS. 4 and 5. Indeed, it is preferred that all network modules have identical hardware and are distinguishable only in terms of their memory content. Further, there is provided a service connector 61, which is adapted to connect a programming device 70 and/or a servicing device 71 and is preferably localised in order to be easily accessible. Each of the programming device 70 and the servicing device 71 may be embodied as a workstation, personal computer, computer terminal, mobile communication device or the like. The servicing device 71 may receive information regarding the status and health of operational components which is obtained through diagnostic methods carried out by a combined control/connector or power supply module in the network. Such diagnostic methods may be initiated periodically, so that the information is ready and available on request by the servicing device 71, or may be initiated by a diagnosis communication transmitted by the servicing device when connected to the network. In response hereto, the servicing device 71 receives a communication containing diagnostic information.

Moreover, to facilitate error detection, which is a crucial part of most service operations, the network modules of the domestic appliance may be controllable externally by communications transmitted from the servicing device 71. This allows testing—as well as repeated testing—of specific functionalities of the operational components, which may otherwise be effected only once in a work cycle of the appliance. Further still, the servicing device 71 may be adapted to upgrade the software stored in the network modules The downloading (or flashing) of software to the respective memories 36 of the combined control/connectors 3 may take place after the operational components 4 have been physically connected to the former and these have been physically interconnected through the bus 2 of the domestic appliance 1. To initiate the network, which may be said to involve a functional interconnection of these devices, a programming device 70 is connected to the bus at the service connector 61.

More precisely, the programming may take place after a personalisation phase effected at (first) powering up of the modules, as encoded by instructions stored in a non-volatile storage arranged within the memory 36 or the processing means 32. These instructions may be stored into the non-volatile storage at manufacture of the modules, for the personalisation can be deemed to be necessary or useful irrespective of the domestic appliance that the modules are to be used in. In the personalisation phase, each module assumes a label which identifies the operational component connected to the module. If no operational component is connected, the module may assume a "blank" label indicating this or may choose to be devoid of a label, whereby it may be excluded from cooperation in the network if a network communication protocol so defines. The label should identify the operational component rather than the module connecting the component to the bus, as the former information is arguably more relevant for operating the domestic appliance. In one embodiment, the module may interact with the operational component connected to it in order to obtain information identifying the component, e.g., by transmitting an inquiry to the component and receiving a response. Based on the identity of the operational component the module defines a label and assumes this for later reference.

In an alternative embodiment, the personalisation of the modules is not carried out automatically at powering-up, but takes place in response to instructions transmitted from the programming device 70.

After personalisation, the modules can be referenced by individual labels, so that one communication transmitted over the network (as in the embodiments discussed previously, communications are preferably not sent between two specific modules but are rather sent in an open fashion over the bus, allowing every network module to receive the communication and, possibly, to take action necessitated by this) can be specified as requiring action from one or more particular modules. This provides for an advantageous procedure for downloading software to the modules. As a considerable portion of the software is common to all modules—this regards, e.g., the communication protocol for the bus, procedures relating to calibration of units in the modules—this portion can be downloaded to all modules at once by means of a non-specified communication. The individual portion of a module's software is provided in at least one other communication, transmitted before or after the communication containing the common portion, specified by the label of the module. It is noted that the common portion of the software is, as a rule, specific to the domestic appliance and downloading it already at manufacture of the (generic) network modules would limit their adaptability to different applications, that is, between different types of domestic appliances.

Figure 8:
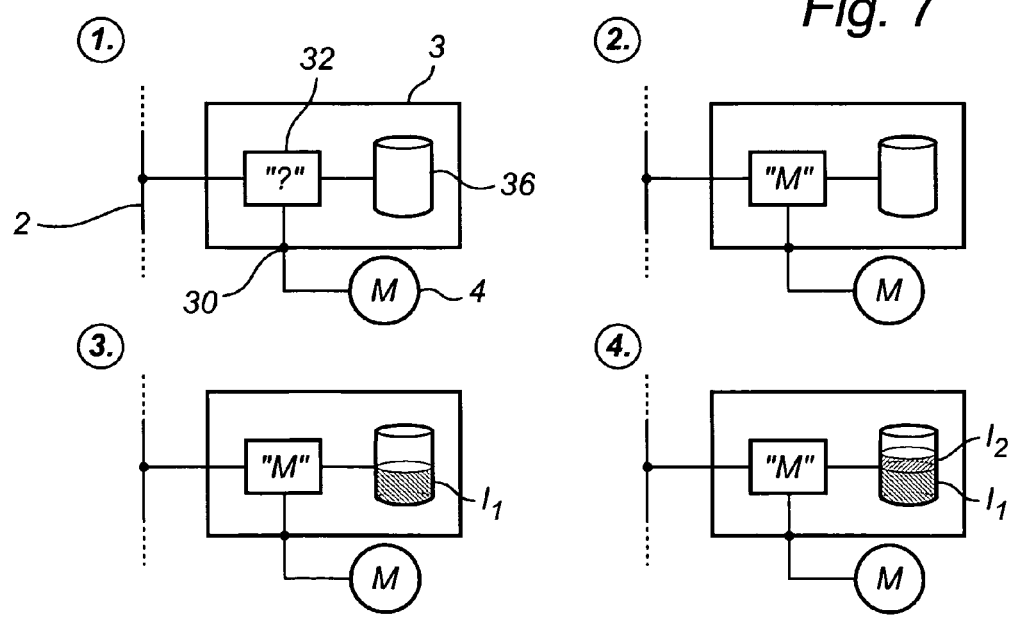
FIG. 8 shows a combined control/connector at four different points in time of the initiation of a network in a domestic appliance according to an embodiment of the invention.

FIG. 8 shows a time evolution of a module, exemplified by a combined control/connector 3 connected, on the one hand, to a bus 2 in a domestic appliance (not shown) and, on the other, to an operational component exemplified by a motor 4 connected via a connecting means 30. In this embodiment, the processing means 32 of the combined control/connector is responsible for storing a label identifying the motor 4 and for monitoring bus traffic for communications specified by this label. A memory 36 is adapted to store processor-executable instructions (software). Directly after powering-up, at a time point 1, the processing means 32 does not store a label and the memory 36 is empty. At point 2, personalisation has taken place, and the processing means 32 stores a label "M" identifying the motor 4. The memory is still empty. Point 3 lies after the download of the common portion I1 of the software to the memory 36 via the bus 2 from a programming device (not shown). Suitably, the common portion I1 is distributed by means of a non-specified communication instructing all modules, including the present one, to store the common portion I1 in their respective memories. An individual software portion I2 is downloaded between time points 3 and 4, preferably as part of a communication transmitted by the programming device 70 and encoding the label "M" which specifies it for the combined control/connector 3 shown in FIG. 8. The later downloading of software may be preceded or followed by downloads of further individual software portions to other modules. It is also possible to effect download of a software portion that is common to a sub-group of modules but not to all; this may then be carried out by means of a communication specified by the labels of the modules in the sub-group. The common, partially common and individual portions may be stored in the same memory, in separate segments of one memory or in different memories of the combined control/connectors.

In an alternative embodiment, the same software is downloaded to all network modules but portions thereof are then masked, disabled or deleted, in accordance with a subsequent personalized communication transmitted to each module. Alternatively, each network module is adapted to perform the masking itself by combining instructions in the software code with the knowledge of the identity of its operational component. Clearly, the use of memory resources in the embodiments discussed in this paragraph do not, however, represent an equally memory-economic procedure as the selective downloading discussed previously.

A very advantageous feature of the present embodiment is that the labels assumed by the network modules are determined by the operational components connected to the modules. Therefore, since the labels identify the respective operational components, it is possible to reference the modules in the software code in terms of their associated operational components, in other words, in terms of their operational capabilities in the domestic appliance. As a consequence, a software programme for controlling the domestic appliance may be written in advance, thus without knowing where a particular network module will be arranged in the appliance at assembly, but may still successfully include commands influencing a well-defined operational component—or an operational component of a well-defined type—through the intermediary of this network module.

As a particular example, the software may contain instructions causing a network module, e.g., a combined control/connector, to transmit a communication specified for a module responsible for a particular operational component. This is useful, inter alia, for effecting transitions between operational phases, as outlined above.

In a variant to this embodiment, which may be time-economical but may also require greater care from the persons involved in assembly, the network modules (combined control/connectors or power supply modules) are pre-programmed after connection to the operational components but before they are physically interconnected via the bus. As an alternative, the network modules may be pre-programmed before they are physically connected to any other device. Such approach will probably require tagging the network modules so that they are mounted at proper locations in the domestic appliance.

V

It is advantageous to combined technical features from several of the embodiments described above. A few particular examples are:

(i) A bus in a domestic appliance has connected to it a plurality of modules, which are either identical throughout regarding hardware (differing, possibly, with respect to memory content) or are identical (up to memory content) within each of two groups, namely a first group containing identical combined control/connectors and a second group containing at least one power supply module. Operational components of the domestic appliance are connected to the modules. The modules are adapted to control the domestic appliance non-hierarchically in the sense further detailed above.

(ii) A bus in a domestic appliance has connected to it a plurality of modules, which are either identical throughout regarding hardware (differing, possibly, with respect to memory content) or are identical (up to memory content) within each of two groups, namely a first group containing identical combined control/connectors and a second group containing at least one power supply module. Operational components of the domestic appliance are connected to the modules. The modules are programmable at initiation in a one-point fashion, namely by connecting a programming device to a point on the bus and downloading software separated into at least one common portion and at least one individual portion.

(iii) A bus in a domestic appliance has connected to it a plurality of modules, which are either identical throughout regarding hardware (differing, possibly, with respect to memory content) or are identical (up to memory content) within each of two groups, namely a first group containing identical combined control/connectors and a second group containing at least one power supply module. Operational components of the domestic appliance are connected to the modules. After programming at initiation in a one-point fashion, by connecting a programming device to a point on the bus and downloading software separated into at least one common portion and at least one individual portion, the modules are adapted to cooperate in order to control the domestic appliance non-hierarchically, as further detailed above.

(iv) Modules in a domestic appliance are interconnected via a bus, and operational components of the domestic appliance are connected to the modules. After programming at initiation in a one-point fashion, by connecting a programming device to a point on the bus and downloading software separated into at least one common portion and at least one individual portion, the modules are adapted to cooperate in order to control the domestic appliance non-hierarchically, as further detailed above.

In addition to the embodiments described in this section and earlier, the invention can be embodied as follows:

Embodiment 1: A domestic appliance (1) comprising a bus (2) disposed within the domestic appliance (1), characterized in that multiple combined control/connectors (3a, 3b, 3c, 3d, ...) are electrically coupled to the bus (2), wherein each combined control/connector (3a, 3b, 3c, 3d, ...) is electrically connected via the bus (2) to at least one of the other combined control/connectors (3a, 3b, 3c, 3d, ...) to thereby power the at least one combined control/connector (3a, 3b, 3c, 3d, ...), and wherein each combined control/connector (3a, 3b, 3c, 3d, ...) is communicatively coupled to a respective operational component (4a, 4b, 4c, 4d, ...) of the domestic appliance (1) to thereby control the same, said operational component (4a, 4b, 4c, 4d, ...) being associated with a certain operation or function of the domestic appliance.

Embodiment 2: The domestic appliance (1) according to embodiment 1, wherein each combined control/connector comprises a connector block into which a controller is integrated.

Embodiment 3: The domestic appliance (1) according to embodiment 1 or 2, wherein one of the combined control/connectors (3a, 3b, 3c, 3d, ...) is configured to act as a master node and the rest of the combined control/connectors (3a, 3b, 3c, 3d, ...) are configured to act as slave nodes, and wherein the master node is adapted for establishing communication between the master node and the slave nodes, and each slave node is configured to be responsive to at least one of a plurality of slave node address codes so as to generate a slave node response signal to the master node.

Embodiment 4: The domestic appliance according to embodiment 3, wherein the bus comprises both a communications bus configured for passage of digital communications signals between the combined control/connector (3a, 3b, 3c, 3d, ...) acting as the master node and the combined control/connectors (3a, 3b, 3c, 3d, ...) acting as slave nodes, and a power bus configured for providing electrical power to the combined control/connectors (3a, 3b, 3c, 3d, ...).

Embodiment 5: The domestic appliance (1) according to any of the preceding embodiments, wherein each combined control/connector (3a, 3b, 3c, 3d, ...) comprises a controller (31) configured to control the respective operational component (4a, 4b, 4c, 4d, ...) in dependence of an operational profile of the domestic appliance (1).

Embodiment 6: The domestic appliance (1) according to any of the preceding embodiments, wherein each combined control/connector (3a, 3b, 3c, 3d, ...) comprises a controller (31) configured to sense a condition of the respective operational component (4a, 4b, 4c, 4d, ...) and generate control signals to components of the domestic appliance (1) in dependence of the sensed condition.

Embodiment 7: The domestic appliance (1) according to embodiment 5 or 6, wherein the controller (31) comprises a processor (32) and a communications module (33) communicatively coupled to the processor (32), wherein the communications module (33) is configured for passage of a control signal, generated by the processor (32), between the combined control/connector (3a, 3b, 3c, 3d, ...) and its respective operational component (4a, 4b, 4c, 4d, ...) for controlling the operation of said operational component.

Embodiment 8: The domestic appliance (1) according to any of embodiments 4 to 7, wherein the power bus is configured for providing electrical power to the operational components (4a, 4b, 4c, 4d, ...) via the respective combined control/connectors (3a, 3b, 3c, 3d, ...).

Embodiment 9: The domestic appliance (1) according to any of the preceding embodiments, wherein domestic appliance (1) is a washing machine.

Embodiment 10: The domestic appliance according to any of the preceding embodiments, wherein domestic appliance (1) is a dishwasher.

Embodiment 11: The domestic appliance (1) according to embodiment 9 or 10, wherein the operational component (4a, 4b, 4c, 4d, ...) is a component from the group comprising: a motor, a pump, a heater, a sensor, or a valve.

Embodiment 12: The domestic appliance (1) according to any of embodiments 1 to 8, wherein domestic appliance is an appliance from the group comprising: a refrigerator, a freezer, a drying cabinet, a stove, an oven or a microwave oven.

VI

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

It is pointed out that the drawings refer to functional structures and may not correspond to the precise hardware structure of the servers and nodes. One hardware unit may be adapted to execute more than one of the indicated tasks and one task may be effected by several cooperating units. In particular, a processing device may be adapted to execute a number of different functions in an entity operating in the content delivery system.

A number of the disclosed methods may be implemented as a computer program and may be distributed when stored by a computer-readable medium. By way of example, computer-readable mediums may comprise computer storage media and communication media. As is well known to a person skilled in the art, computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is known to the skilled person that communication media typically embodies computer readable instructions, data structures, program modules or other data in a modulated data signal such as a carrier wave or other transport mechanism and includes any information delivery media.

The invention claimed is:

1. A combined control/connector, which comprises:
   a processing means;
   a memory for storing instructions executable by the processing means; and
   a connecting means for connecting to an operational component of a domestic appliance, said connecting means being communicatively coupled to the processing means,
   wherein the combined control/connector is configured to form a network comprising at least one second combined control/connector communicatively coupled to it via a bus in a domestic appliance, wherein the second combined control/connector comprises a second processing means and a second connecting means for connecting to a second operational component of the domestic appliance;
   wherein the combined control/connector is configured, at initiation of the network, to:
   determine the identity of an operational component connected to the connecting means and to assume a label identifying the operational component;
   receive, via the bus, a non-specified first communication containing first instructions executable by the processing means and store the first instructions in the memory;
   receive, via the bus, a second communication which is specified by the label identifying the operational component and contains second instructions executable by the processing means and store the second instructions in the memory;
   cause transmission of, via the bus, a third communication specifying a second label and containing third instructions executable by the second processing means, wherein the second label identifies the second operational component; and
   wherein the combined control/connector is configured, after initiation of the network, to cooperate with the at least one second combined control/connector in the network.

2. The combined control/connector of claim 1, configured to cooperate, after initiation of the network, with at least one third combined control/connector in the network in order to control the domestic appliance, and to achieve this, to interact with the operational component.

3. The combined control/connector of claim 2 configured to cooperate, after initiation of the network, with the at least one second and third combined control/connectors in the network in order to control the domestic appliance non-hierarchically.

4. A domestic appliance comprising a bus having connected to it a combined control/connector according to claim 1.

5. The domestic appliance of claim 4, wherein the combined control/connector and the at least one second combined control/connectors are connected to the bus.

6. The domestic appliance of claim 4, further comprising a service connector communicatively coupled to the bus and configured to connect to a programming device for transmitting communications containing instructions to be stored in the memory of at least one combined control/connector.

7. The domestic appliance of claim 6, wherein the service connector is further configured to connect a servicing device for transmitting communications for controlling the combined control/connectors.

8. The domestic appliance of claim 7, wherein the combined control/connector is configured to receive a diagnosis communication from a servicing device and to transmit, responsive thereto, a communication containing diagnostic information relating to the operational component.

9. A method of initiating a network in a domestic appliance, the network comprising a plurality of combined control/connectors communicatively connected via a bus, wherein each combined control/connector comprises:
   a processing means;
   a memory for storing instructions executable by the processing means; and
   a connecting means for connecting to an operational component of the domestic appliance, wherein the connecting means is communicatively coupled to the processing means;
   the method including:
   connecting a programming device to the bus;
   transmitting, from the programming device and via the bus, a communication causing each of the combined control/connectors to determine identities of the operational components connected to the respective combined control/connectors and to assume a label identifying the respective operational component;
   transmitting, from the programming device and via the bus, a non-specified communication containing instructions executable by the processing means;

transmitting, from the programming device and via the bus, a communication which is specified by the label of one operational component and contains instructions executable by the processing means of the combined control/connector associated with the label; and disconnecting the programming device such that the network of the plurality of combined control/connectors communicate with each other to control operation of the domestic appliance.

10. The method of claim 9, wherein the instructions contained in at least one of the communications are configured to cause a combined control/connector to control the domestic appliance.

11. The method of claim 10, wherein the instructions contained in at least one of the communications are configured to cause at least two of the combined control/connectors to cooperate so as to control the domestic appliance non-hierarchically.

12. The method of claim 10, wherein the instructions contain at least one reference to a label identifying an operational component.

13. The method of claim 12, wherein the instructions are configured to cause a combined control/connector to transmit a communication specified by a label identifying an operational component connected to another combined control connected.

* * * * *

UNITED STATES PATENT AND TRADEMARK OFFICE
CERTIFICATE OF CORRECTION

PATENT NO. : 8,706,933 B2  Page 1 of 1
APPLICATION NO. : 13/321337
DATED : April 22, 2014
INVENTOR(S) : Pimputkar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 169 days.

Signed and Sealed this

Twenty-ninth Day of September, 2015

Michelle K. Lee
*Director of the United States Patent and Trademark Office*